United States Patent
Ohtani et al.

(10) Patent No.: US 11,420,679 B2
(45) Date of Patent: Aug. 23, 2022

(54) STEERING ASSIST APPARATUS

(71) Applicant: TOYOTA JIDOSHA KABUSHIKI KAISHA, Toyota (JP)

(72) Inventors: Shinya Ohtani, Nagakute (JP); Shinya Sannodo, Toyota (JP); Yuki Minase, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 16/251,846

(22) Filed: Jan. 18, 2019

(65) Prior Publication Data
US 2019/0225267 A1 Jul. 25, 2019

(30) Foreign Application Priority Data
Jan. 22, 2018 (JP) .............................. JP2018-008062

(51) Int. Cl.
*B62D 15/02* (2006.01)
*B60W 30/06* (2006.01)
(Continued)

(52) U.S. Cl.
CPC ......... *B62D 15/0285* (2013.01); *B60W 30/06* (2013.01); *G06V 20/586* (2022.01); *G06V 20/588* (2022.01)

(58) Field of Classification Search
CPC .............. B62D 15/0285; B62D 15/027; B62D 15/029; G06K 9/00791; G06K 9/00798;
(Continued)

(56) References Cited

U.S. PATENT DOCUMENTS

2007/0063874 A1* 3/2007 Danz ...................... G08G 1/166
340/932.2
2015/0258989 A1* 9/2015 Okano ................... B60W 30/06
701/1
(Continued)

FOREIGN PATENT DOCUMENTS

JP 2006-347460 A 12/2006
JP 2009-220682 A 10/2009
(Continued)

OTHER PUBLICATIONS

Sumio, JP-2019077402-A EPO translation Sep. 18, 2020 (Year: 2020).*

*Primary Examiner* — Kevin P Mahne
(74) *Attorney, Agent, or Firm* — Sughrue Mion, PLLC

(57) ABSTRACT

A steering assist apparatus is configured to, when performing a steering assist control for parking, perform one or both of the following processes (a) and (b): (a) a first setting process for setting a movement path when an oncoming lane is present, the first setting process being a process for setting the movement path in such a manner that a vehicle body does not enter the oncoming lane side from an own lane across a center line or a predetermined line obtained by translating the center line; and (b) a second setting process for setting the movement path when a following vehicle is present, the second setting process being a process for setting the movement path in such a manner that a distance between the vehicle body and a parking-possible region is less than a predetermined threshold.

5 Claims, 7 Drawing Sheets

(51) Int. Cl.
    *B60W 30/18*     (2012.01)
    *G06V 20/58*     (2022.01)
    *G06V 20/56*     (2022.01)

(58) Field of Classification Search
    CPC ........... G06K 9/00805; G06K 9/00812; G06K 9/00825; B60W 30/18145; B60W 30/06; B60W 2554/00
    See application file for complete search history.

(56) References Cited

U.S. PATENT DOCUMENTS

| | | | |
|---|---|---|---|
| 2017/0129486 A1* | 5/2017 | Nakada | B60W 10/20 |
| 2018/0022344 A1* | 1/2018 | Tseng | B60W 10/20 |
| | | | 701/23 |
| 2018/0037262 A1* | 2/2018 | Imai | G08G 1/0962 |
| 2019/0027042 A1* | 1/2019 | Fujishima | B60W 30/06 |
| 2019/0101925 A1* | 4/2019 | Simmons | G05D 1/0088 |
| 2019/0118801 A1* | 4/2019 | Noh | G06K 9/00805 |
| 2019/0176888 A1* | 6/2019 | Lee | G05D 1/0225 |

FOREIGN PATENT DOCUMENTS

| | | | |
|---|---|---|---|
| JP | 2013-241088 A | | 12/2013 |
| JP | 2019077402 A | * | 5/2019 |

* cited by examiner

STEERING ASSIST APPARATUS

CLAIM OF PRIORITY

The present application claims priority from Japanese patent application JP 2018-008062 filed on Jan. 22, 2018, the content of which is hereby incorporated by reference into this application.

BACKGROUND

1. Technical Field

The present disclosure relates to a steering assist apparatus configured to assist/support a steering operation of a driver when a vehicle is parked.

2. Description of the Related Art

Hitherto, there is proposed a steering assist apparatus configured to detect a peripheral state of a vehicle when the vehicle is parked, and assist a steering operation of a driver in such a manner that the vehicle moves/travels along a movement path set based on the detected peripheral state (for example, refer to JP 2006-347460 A).

The apparatus proposed in JP 2006-347460 A (hereinafter referred to as a "related-art apparatus") detects a region in which obstacles are not present by using ultrasonic sensors, cameras and the like, and sets, as a target position, a position of the vehicle to be reached when the vehicle completes the parking in the detected region. Further, the related-art apparatus detects a space which can be used for moving the vehicle by using the ultrasonic sensors, the cameras and the like. The related-art apparatus sets a movement path to the target position in response to a size of the space, and performs a steering assist control in such a manner that the vehicle moves along the movement path.

However, in a situation in which an oncoming lane is present, there is a possibility that an other vehicle (hereinafter referred to as an "oncoming vehicle") travels in the oncoming lane during the steering assist control. When a width of the above-mentioned space is equal to or larger than a predetermined width, the related-art apparatus sets a position far from the target position as a travel-direction switching position (hereinafter simply referred to as a "switching position") at which a position of a shift lever is switched from a drive position (D) to a reverse position (R). Therefore, the related-art apparatus can set, as the movement path, a path in which the steering of a steering wheel is not required at the switching position.

However, even if the oncoming lane is present, the related-art apparatus may set the movement path in such a manner that the vehicle (own vehicle) enters the oncoming lane. In this case, the own vehicle may obstruct the running of the oncoming vehicle during the steering assist control.

Further, a situation may occur in which an other vehicle (hereinafter referred to as a "following vehicle") is present behind the own vehicle. The related-art apparatus sets the switching position to a position far from the target position as described above, and thus, a relatively wide space occurs between the own vehicle and the target position when the own vehicle has reached the switching position. Therefore, there is a possibility that the following vehicle may enter the above-mentioned space. In this case, the own vehicle cannot move backward to be parked at the target position.

SUMMARY

One or more embodiments described below have been devised in view of the above-mentioned problem. Specifically, the one or more embodiments provide a steering assist apparatus capable of setting a movement path used for steering assist in suitable manner in view of a possibility that other vehicles (that is, oncoming vehicle and/or following vehicle) are present in the periphery of the own vehicle or come close to the own vehicle.

There is provided one embodiment of a steering assist apparatus (hereinafter also referred to as "embodiment apparatus") applied to an own vehicle. The steering assist apparatus includes:

a peripheral state acquiring device (81, 82, 83, 84) configured to acquire vehicle-peripheral information on a vehicle peripheral state including partition lines and three-dimensional objects which are present in a periphery of the own vehicle;

a path setting module (10Y) configured to extract a parking-possible region (As) in the periphery of the own vehicle based on the vehicle-peripheral information acquired by the peripheral state acquiring device, and set a movement path from a current position of the own vehicle to the parking-possible region;

a steering assist device (10Z) configured to perform a steering assist control for assisting a steering operation of a driver in such a manner that the own vehicle travels/moves along the movement path set by the path setting module; and a request monitoring device (10) configured to determine whether or not a steering assist request is made/generated.

Further, when the steering assist request is made/generated, the path setting module is configured to perform one or both of the following processes:

a first setting process (Step 640) for setting the movement path when the path setting module determines that an oncoming lane adjacent to an own lane in which the own vehicle is traveling is present based on the vehicle-peripheral information acquired by the peripheral state acquiring device (Step 635:Yes), the first setting process being a process for setting the movement path in such a manner that a vehicle body of the own vehicle does not enter a side of the oncoming lane from the own lane across (i) a center line partitioning the own lane and the oncoming lane or (ii) a predetermined line obtained by translating the center line in a road-width direction by a predetermined distance; and a second setting process (Step 655) for setting the movement path when the path setting module determines that a following vehicle traveling behind the own vehicle is present based on the vehicle-peripheral information acquired by the peripheral state acquiring device (Step 645:Yes), the second setting process being a process for setting the movement path in such a manner that a distance in the road-width direction between the vehicle body of the own vehicle and the parking-possible region is less than a predetermined distance threshold while the own vehicle is traveling/moving along the movement path.

The embodiment apparatus is configured to, when the oncoming lane is present, move the own vehicle in such a manner that the vehicle body does not enter the oncoming lane side from the own lane across the center line or the predetermined line obtained by translating the center line while the own vehicle is moving along the movement path. Therefore, it is possible to reduce a possibility that the own vehicle obstructs (interferes with) the running/traveling of the oncoming vehicle.

Further, the embodiment apparatus is configured to, when the following vehicle is present, move the own vehicle in such a manner that the distance in the road-width direction between the vehicle body of the own vehicle and the parking-possible region becomes less than the predetermined distance threshold (for example, a distance through which the following vehicle can pass) while the own vehicle is moving along the movement path. Therefore, it is possible to prevent the following vehicle from entering a space between own vehicle and the parking-possible region during the steering assist control.

In another aspect of the embodiment apparatus, the path setting module is configured to, when the own vehicle cannot move to the parking-possible region through one backward movement or one forward movement, set at least a first path (P1) and a second path (P2) as the movement path, the first path being a path for moving the own vehicle from the current position to a travel-direction switching position (S1) for switching a travel direction of the own vehicle, and the second path being a path for moving the own vehicle from the travel-direction switching position to the parking-possible region.

The path setting module is further configured to set the first path and the second path in the first setting process in such a manner that (i) when the own vehicle moves from the current position to the travel-direction switching position along the first path, the vehicle body does not enter the side of the oncoming lane from the own lane across the center line or the predetermined line, and (ii) when the own vehicle moves from the travel-direction switching position to the parking-possible region along the second path, the vehicle body does not enter the side of the oncoming lane from the own lane across the center line or the predetermined line, and The path setting module is further configured to set the first path and the second path in the second setting process in such a manner that the distance in the road-width direction between the vehicle body of the own vehicle and the parking-possible region does not exceed the predetermined distance threshold when the own vehicle reaches the travel-direction switching position.

According to the present aspect, when the oncoming lane is present, while the own vehicle is moving along the first path and the second path, the vehicle body of the own vehicle does not enter the oncoming lane side from the own lane across the center line or the predetermined line obtained by translating the center line. Therefore, it is possible to reduce a possibility that the own vehicle obstructs the running of the oncoming vehicle.

Further, when the following vehicle is present, while the own vehicle is moving along the first path and the second path, the distance in the road-width direction between the vehicle body of the own vehicle and the parking-possible region becomes less than the predetermined distance threshold. Therefore, it is possible to prevent the following vehicle from entering the space between own vehicle and the parking-possible region during the steering assist control.

In another aspect of the embodiment apparatus, the path setting module is configured to set the first path in the second setting process in such a manner that a part (100a, 100b) of the vehicle body of the own vehicle is present in an entry prevention area (At) which is set in the own lane and adjacent to the parking-possible region when the own vehicle reaches the travel-direction switching position.

According to the present aspect, even when the own vehicle moves to the furthest position from the parking-possible region (that is, the own vehicle reaches the travel-direction switching position), the part of the vehicle body of the own vehicle occupies the entry prevention area. Therefore, it is possible to more effectively prevent the following vehicle from entering between the own vehicle and the target position.

In another aspect of the embodiment apparatus, the path setting module is configured to set the first path in the second setting process in such a manner that at least a rear end portion (100b) of a side surface of the vehicle body on a side close to the following vehicle is present in the entry prevention area when the own vehicle reaches the travel-direction switching position.

According to the present aspect, a wider part of the vehicle body occupies the entry prevention area when the own vehicle reaches the travel-direction switching position, and therefore, the space between the own vehicle and the parking-possible region becomes smaller. Therefore, it is possible to more effectively prevent the following vehicle from entering the entry prevention area.

In another aspect of the embodiment apparatus, the path setting module is configured to perform the second setting process when the following vehicle is present and a time (Tc) required for the following vehicle to reach the current position of the own vehicle is equal to or less than a predetermined time threshold.

According to the present aspect, it is possible to perform the second setting process when the time required for the following vehicle to reach the current position of the own vehicle is relatively short (that is, there is a high possibility that the following vehicle enters the space between the own vehicle and the parking-possible region during the steering assist control).

In another aspect of the embodiment apparatus, the path setting module is configured to:

perform the first setting process when the path setting module determines that the oncoming lane is present; and perform the second setting process when the path setting module determines that the oncoming lane is not present and the following vehicle is present.

According to the present aspect, it is possible to select any one of the first setting process and the second setting process in a suitable manner depending on which of the oncoming vehicle and the following vehicle is present in the periphery of the own vehicle or comes close to the own vehicle.

Further features relating to the above one or more aspects of the embodiment apparatus become apparent from the description herein and the accompanying drawings. Problems, configurations, and effects other than those described above become apparent from the following description of embodiments.

In the above description, in order to facilitate understanding of the above one or more aspect of the embodiment apparatus, a name and/or reference numeral used in embodiments described below is enclosed in parentheses and assigned to each of the constituent features corresponding to the embodiments. However, each of the constituent features is not limited to the embodiments defined by the name and/or reference numeral.

DETAILED DESCRIPTION OF THE EMBODIMENTS

Now, referring to the accompanying drawings, a description is given of embodiments. The accompanying drawings are illustrations of one or more specific embodiments in conformity with the principle thereof, but those illustrations are mere examples to be used for the understanding of the embodiments, and are not to be used to limit the interpretation of the present disclosure.

<Configuration>

A steering assist apparatus (hereinafter also referred to as an "embodiment apparatus") according to an embodiment is applied to a vehicle (hereinafter also referred to as an "own vehicle" in order to distinguish it from other vehicles).

Figure 1:
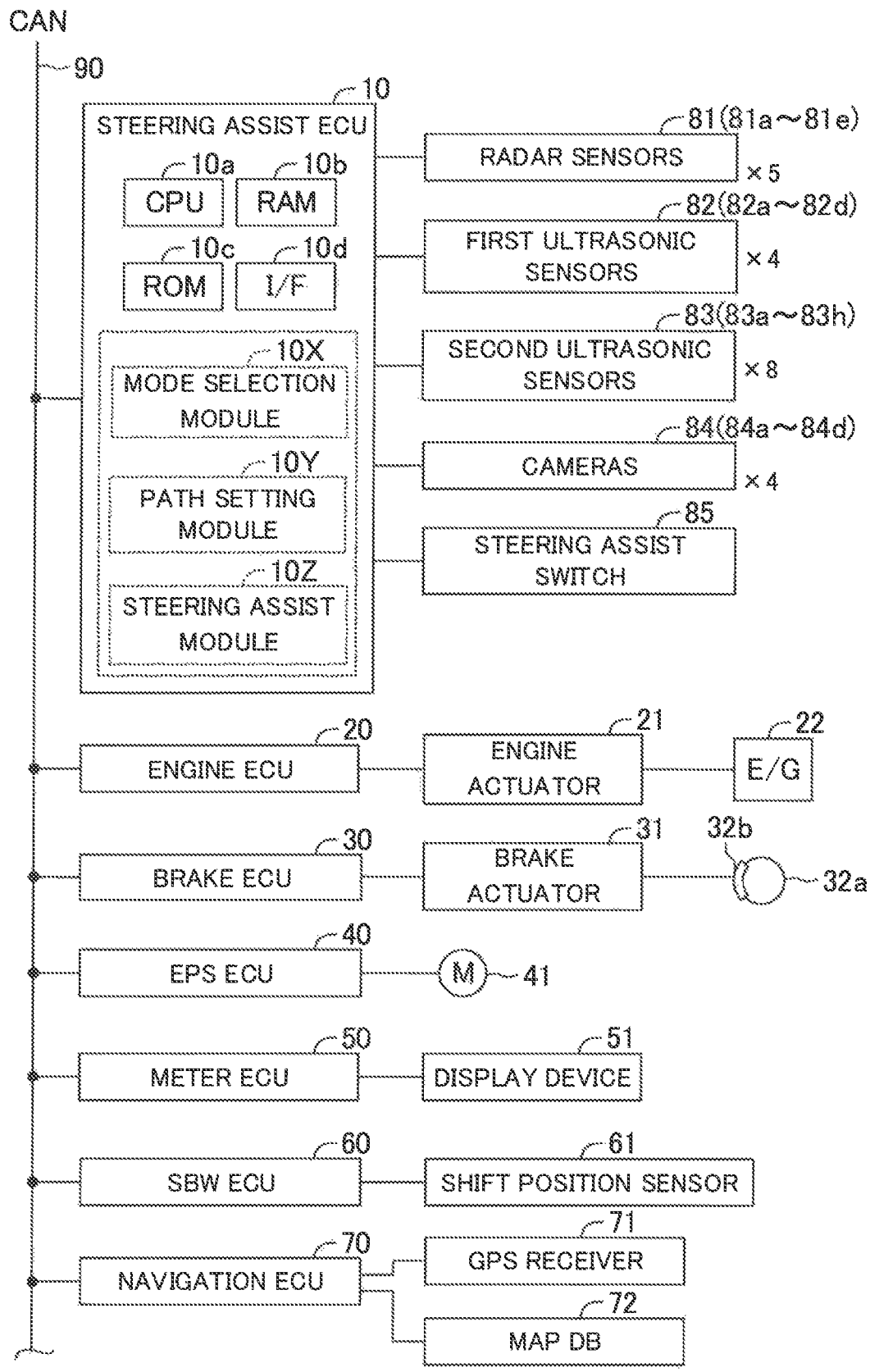
FIG. 1 is a schematic configuration diagram for illustrating a steering assist apparatus applied to an own vehicle according to an embodiment of the present disclosure.

As illustrated in FIG. 1, the embodiment apparatus includes a steering assist ECU 10 including a microcomputer as a principal component thereof. This microcomputer includes a CPU 10a, a RAM 10b, a ROM 10c, an interface (I/F) 10d, and the like. The CPU 10a is configured to execute instructions (programs and routines) stored in the ROM 10c to implement various functions. The ECU herein stands for "electric control unit". The ECU includes a microcomputer including a CPU, a RAM, a ROM, an interface, and the like. The CPU is configured to execute instructions stored in the ROM to implement various functions.

The steering assist ECU 10 is connected to an engine ECU 20, a brake ECU 30, an electric power steering ECU (hereinafter referred to as an "EPS ECU") 40, a meter ECU 50, a shift-by-wire (SBW) ECU 60 and a navigation ECU 70 via a controller area network (CAN) 90. Those ECUs are connected to one another so as to be capable of mutually transmitting and receiving information via the CAN 90. Thus, a detection value obtained by a sensor connected to a specific ECU of those ECUs is transmitted to ECUs other than the specific ECU.

The engine ECU 20 is connected to an engine actuator 21. The engine actuator 21 includes a throttle valve actuator configured to change an opening degree of a throttle valve of an internal combustion engine 22. The engine ECU 20 can change a torque generated by the internal combustion engine 22 through driving the engine actuator 21. Thus, the engine ECU 20 can control a driving force of the own vehicle through controlling the engine actuator 21. When the vehicle is a hybrid vehicle, the engine ECU 20 can control a driving force of the own vehicle generated by any one of or both of "an internal combustion engine and a motor" serving as vehicle driving sources. Further, when the vehicle is an electric vehicle, the engine ECU 20 can control a driving force of the own vehicle generated by a motor serving as a vehicle driving source.

The brake ECU 30 is connected to a brake actuator 31. The brake actuator 31 adjusts a hydraulic pressure of liquid to be supplied to wheel cylinders integrated into brake calipers 32b in accordance with an instruction from the brake ECU 30, so as to use the hydraulic pressure to press brake pads against brake discs 32a, to thereby generate friction braking forces. Thus, the brake ECU 30 can control a braking force of the own vehicle through controlling the brake actuator 31.

The EPS ECU 40 is connected to an assist motor (M) 41. The assist motor 41 is integrated into a "steering mechanism including a steering wheel, a steering shaft coupled to the steering wheel, and a gear mechanism for steering" (not shown) of the vehicle. The EPS ECU 40 uses a steering torque sensor (not shown) provided in the steering shaft to detect a steering torque input to the steering wheel by the driver, to thereby drive the assist motor 41 based on the steering torque. The EPS ECU 40 applies a steering torque (steering assist torque) to the steering mechanism through the drive of the assist motor 41, to thereby assist a steering operation of the driver.

Further, when the EPS ECU 40 receives a steering command from the steering assist ECU 10 via the CAN 90 during the steering assist control described later, the EPS ECU 40 drives the assist motor 41 based on the steering torque represented by the steering command. This steering torque is different from the above-mentioned steering assist torque applied for reducing the load of the steering operation (steering wheel operation) of the driver, and therefore, is a torque applied to the steering mechanism in response to the steering command from the steering assist ECU 10 without requiring the steering operation of the driver. With this torque, a steered angle of steered wheels of the own vehicle is changed (that is, the steered wheels are steered).

The meter ECU 50 is connected to a display device 51. The display device 51 is a multi-information display provided in front of a driver's seat. The display device 51 displays various types of information in addition to measurement values such as a vehicle speed and an engine revolution speed. The meter ECU 50 displays guidance relating to the assist for parking and exiting from a parking space in accordance with display instructions transmitted from the steering assist ECU 10. The display device 51 is not limited to the multi-information display, and may be a display dedicated for the assist for parking and exiting from a parking space. A head-up display may be employed as the display device 51.

The SBW ECU 60 is connected to a shift position sensor 61. The shift position sensor 61 detects a position of a shift lever serving as a movable portion of a shift operation unit. In this example, positions of the shift lever include a parking position (P), a drive position (D), and a reverse position (R). The SBW ECU 60 is configured to receive the position of the shift lever from the shift position sensor 61 to control a transmission and/or driving-direction switching mechanism (not shown) of the own vehicle based on the shift lever position. That is, the SBW ECU is configured to perform a shift control for the own vehicle. More specifically, when the position of the shift lever is "P", the SBW ECU 60 controls the transmission and/or driving-direction switching mechanism in such a manner that the driving force is not transmitted to drive wheels and the vehicle is thus mechanically locked to a stop position. When the position of the shift lever is "D", the SBW ECU 60 controls the transmission and/or driving-direction switching mechanism in such a manner that the driving force for moving the own vehicle forward is transmitted to the drive wheels. Further, when the position of the shift lever is "R", the SBW ECU 60 controls the transmission and/or driving-direction switching mechanism in such a manner that the driving force for moving the own vehicle backward is transmitted to the drive wheels. The SBW ECU 60 is configured to output to the steering assist ECU 10 a signal indicative of the position of the shift lever received from the shift position sensor 61.

The navigation ECU 70 includes a GPS receiver 71 configured to receive a GPS signal for detecting a current position of the own vehicle, a map database 72 having map information stored therein, and the like. The navigation ECU 70 is configured to perform route guidance for the own vehicle based on the position of the own vehicle and the map information. The map information stored in the map database 72 includes road information. For example, in the road information, the number of lanes included in a road, the width of the road, a gradient of the road, and the like are associated with each road section. The navigation ECU 70 repeatedly transmits the road information to the steering assist ECU 10 every time a predetermined period elapses.

A plurality of radar sensors 81*a* to 81*e*, a plurality of first ultrasonic sensors 82*a* to 82*d*, a plurality of second ultrasonic sensors 83*a* to 83*h*, a plurality of cameras 84*a* to 84*d*, and a steering assist switch 85 are connected to the steering assist ECU 10. The plurality of radar sensors 81*a* to 81*e* are generally referred to as "radar sensors 81". The plurality of first ultrasonic sensors 82*a* to 82*d* are generally referred to as "first ultrasonic sensors 82". The plurality of second ultrasonic sensors 83*a* to 83*h* are generally referred to as "second ultrasonic sensors 83". The plurality of cameras 84*a* to 84*d* are generally referred to as "cameras 84".

Each of the radar sensors 81 includes a radar transceiver (radar transmitting/receiving part) (not shown) and a signal processor (not shown). The radar transceiver radiates a radio wave in a millimeter waveband (hereinafter referred to as a "millimeter wave"), and receives a millimeter wave (that is, reflected wave) reflected by a three-dimensional object (e.g., other vehicles, pedestrian, bicycle, and building) present within a radiation range. The signal processor acquires surrounding information based on, for example, a phase difference between the transmitted millimeter wave and the received reflected wave, an attenuation level of the reflected wave, and a time period required from transmission of the millimeter wave to reception of the reflected wave. The surrounding information includes, for example, a distance between the own vehicle and the three-dimensional object, a relative speed between the own vehicle and the three-dimensional object, and a relative position (direction) of the three-dimensional object with respect to the own vehicle. The signal processor transmits the surrounding information to the steering assist ECU 10.

Figure 2:
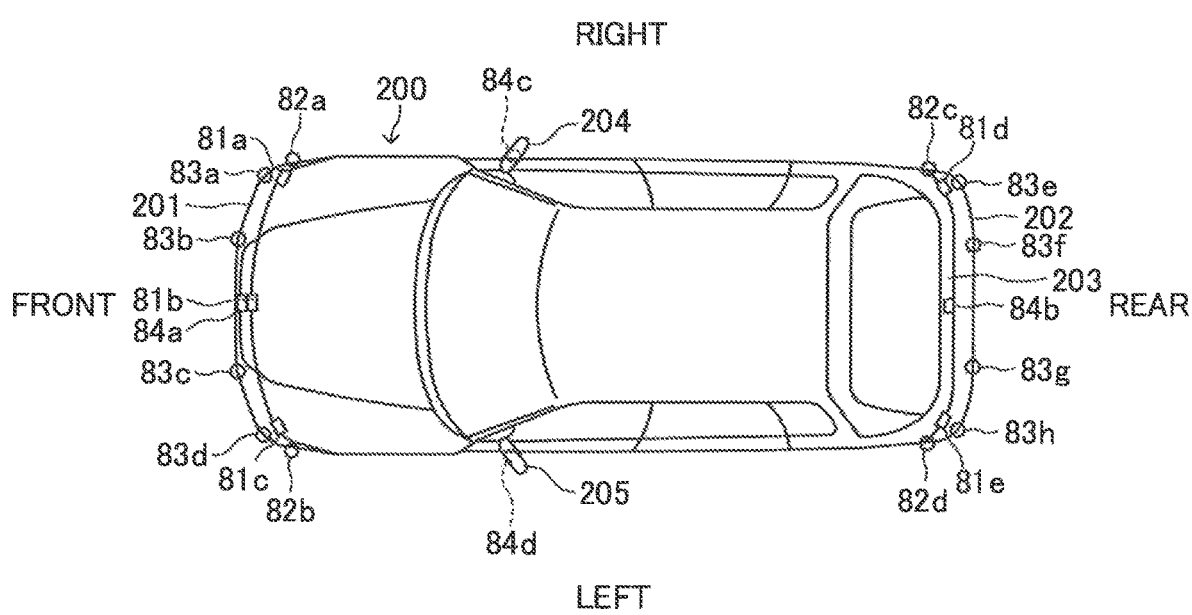
FIG. 2 is a plan view of a vehicle for illustrating an arrangement of radar sensors, first ultrasonic sensors, second ultrasonic sensors and cameras illustrated in FIG. 1.

As illustrated in FIG. 2, the radar sensor 81*a* is disposed at a front-right corner portion of a vehicle body 200, and mainly detects a three-dimensional object present in a front-right region of the own vehicle. The radar sensor 81*b* is disposed at a front-center portion of the vehicle body, and mainly detects a three-dimensional object present in a front region of the own vehicle. The radar sensor 81*c* is disposed at a front-left corner portion of the vehicle body, and mainly detects a three-dimensional object present in a front-left region of the own vehicle. The radar sensor 81*d* is disposed at a rear-right corner portion of the vehicle body, and mainly detects a three-dimensional object present in a rear-right region of the own vehicle. The radar sensor 81*e* is disposed at a rear-left corner portion of the vehicle body, and mainly detects a three-dimensional object present in a rear-left region of the own vehicle. Therefore, the steering assist ECU 10 can acquire a distance between the own vehicle and a following vehicle, and a relative speed of the following vehicle with respect to the own vehicle by using the radar sensors 81*d* and 81*e*.

Each of the first ultrasonic sensors 82 and the second ultrasonic sensors 83 (hereinafter generally referred to as "ultrasonic sensors" when these sensors are not required to be distinguished from each other) transmits an ultrasonic wave having a pulse form in a predetermined range, and receives a reflected wave reflected by a three-dimensional object. The ultrasonic sensor detects absence/presence of a three-dimensional object and a distance to the three-dimensional object based on a period from the transmission of the ultrasonic wave to the reception of the ultrasonic wave.

The first ultrasonic sensors 82 are used to detect a three-dimensional object at a position relatively far from the vehicle compared with the second ultrasonic sensors. As illustrated in FIG. 2, the first ultrasonic sensor 82*a* is mounted at a position on the right side of the front part of the vehicle body 200 (for example, an end on the right side of a front bumper 201), and detects absence/presence of a three-dimensional object on the right side of the front side of the vehicle, and a distance to the three-dimensional object. The first ultrasonic sensor 82*b* is mounted at a position on the left side of the front part of the vehicle body 200 (for example, an end on the left side of the front bumper 201), and detects absence/presence of a three-dimensional object on the left side of the front side of the vehicle, and a distance to the three-dimensional object. The first ultrasonic sensor 82*c* is mounted at a position on the right side of the rear part of the vehicle body 200 (for example, an end on the right side of a rear bumper 202), and detects absence/presence of a three-dimensional object on the right side of the rear side of the vehicle, and a distance to the three-dimensional object. Further, the first ultrasonic sensor 82*d* is mounted at a position on the left side of the rear part of the vehicle body 200 (for example, an end on the left side of the rear bumper 202), and detects absence/presence of a three-dimensional object on the left side of the rear side of the vehicle, and a distance to the three-dimensional object.

The second ultrasonic sensors 83 are used to detect a three-dimensional object at a position relatively close to the vehicle. As illustrated in FIG. 2, the four second ultrasonic sensors 83*a* to 83*d* are mounted to the front bumper 201 at intervals in a vehicle widthwise direction. The second ultrasonic sensors 83*a* to 83*d* detect absence/presence of a three-dimensional object in front of the vehicle, and a distance to the three-dimensional object. Further, the four second ultrasonic sensors 83*e* to 83*h* are mounted to the rear bumper 202 at intervals in the vehicle widthwise direction. The second ultrasonic sensors 83*e* to 83*h* detect absence/presence of a three-dimensional object in the back of the vehicle, and a distance to the three-dimensional object.

Each of the plurality of cameras 84*a* to 84*d* is a digital camera incorporating an image pickup device such as a charge coupled device (CCD) and a CMOS image sensor (CIS). Each of the cameras 84a to 84d outputs image data at a predetermined frame rate. An optical axis of each of the cameras 84a to 84d is set obliquely downward from the vehicle body of the vehicle. Thus, each of the cameras 84a to 84d picks up an image of a peripheral state (including partition lines, a three-dimensional object, and a parking-possible region in which the vehicle can be parked) of the vehicle to be checked when the vehicle is parked or exits from the parking space, and outputs data on the obtained image to the steering assist ECU 10.

As illustrated in FIG. 2, the camera 84a is mounted to substantially a center part of the front bumper 201 in the vehicle widthwise direction, and acquires image data in front of (ahead of) the vehicle. The camera 84b is mounted to a wall part of a rear trunk 203 in the rear part of the vehicle body 200, and acquires image data in the back of the vehicle. The camera 84c is mounted to a door mirror 204 on a right side of the vehicle, and acquires image data on the right side of the vehicle. The camera 84d is mounted to a door mirror 205 on a left side of the vehicle, and acquires image data on the left side of the vehicle.

The steering assist ECU 10 receives the detection signal from each of the first ultrasonic sensors 82 and the second ultrasonic sensors 83 every time a predetermined period elapses. The steering assist ECU 10 converts information (namely, a position of a reflection point, which is a point at which the transmitted ultrasonic wave is reflected) contained in each of the detection signals into coordinates in a two-dimensional map in which a position of the own vehicle and a travel direction of the own vehicle are set as references. Here, the "position of the own vehicle" is the center position in the plan view of the own vehicle. The steering assist ECU 10 detects a "region in which three-dimensional objects are not present" in a periphery of the own vehicle based on a shape of a group of the reflection points on the two-dimensional map. The steering assist ECU 10 extracts a region having a size which is large enough for the own vehicle to be parked (or a region to which the own vehicle can be moved from the parking space) in the two-dimensional map. The region extracted as the region in which the own vehicle can be parked (or to which the own vehicle can be moved from the parking space) is hereinafter referred to as "candidate region".

The steering assist ECU 10 acquires the image data from each of the cameras 84 every time a predetermined period elapses. The steering assist ECU 10 analyzes the image data from each of the cameras 84 to thereby detect three-dimensional objects which are present in the periphery of the own vehicle. Further, the steering assist ECU 10 detects partition lines (including partition lines for defining a lane, and partition lines for defining a parking area) drawn/painted on a road surface in the image data from each of the cameras 84. The steering assist ECU 10 extracts a region surrounded by the partition lines for defining a parking area as the "candidate region".

The steering assist switch 85 is a switch to be operated (pressed or depressed) when the driver instructs the steering assist ECU 10 to start the steering assist control. In the present specification, the steering assist control is a well-known control for automatically steering the steering wheel when the vehicle is parked (or when the vehicle is caused to exit from a parking space), to thereby assist/support a parking operation (or exit-from-parking-space operation) of the driver. In addition, the steering assist control is also referred to as "IPA (Intelligent Parking Assist)". The steering assist control has one or more steering assist modes described later. Further, the steering assist switch 85 may have a function of stopping the steering assist control, and a function of resuming the steering assist control.

<Summary of Steering Assist Control>

The steering assist ECU 10 selects any one of a parking mode and an exit-from-parking-space mode as the steering assist mode in response to the position of the shift lever and the number of depressions of the steering assist switch 85. The parking mode includes a perpendicular parking mode and a parallel parking mode. The exit-from-parking-space mode includes only a parallel exit-from-parking-space mode. In this manner, the steering assist ECU 10 includes a "mode selection module (mode selector) 10X configured to select the steering assist mode" implemented by the CPU 10a in terms of its function.

The steering assist ECU 10 monitors the operation of the driver with respect to steering assist switch 85, the position of the shift lever and the vehicle speed to determine whether or not a steering assist request is made/generated. When the position of the shift lever is the drive position (D) and the vehicle speed is equal to or lower than a predetermined vehicle speed (e.g., 30 [km/h]), as the steering assist switch 85 is depressed once, the steering assist ECU 10 determines that the steering assist request for perpendicular parking is made to thereby select the perpendicular parking mode. The perpendicular parking mode is a mode for performing the steering assist when the vehicle is parked in a direction perpendicular to the travel direction of a road. The perpendicular parking is synonymous with moving the own vehicle backward to park the own vehicle in parallel to other parked vehicles. More specifically, the perpendicular parking is an operation of parking the own vehicle in such a manner that one side surface of the own vehicle is opposed to one side surface of another vehicle (first another vehicle), the other side surface of the own vehicle is opposed to one side surface of still another vehicle (second another vehicle), and a longitudinal axis passing through the center in the widthwise direction of the own vehicle and longitudinal axes passing through the centers in the widthwise direction of the first and second another vehicles are parallel to each other. The perpendicular parking mode is also a mode for performing the steering assist when the own vehicle is parked in such a manner that at least one of the left and right side surfaces of the own vehicle is opposed to a white line, a wall, a fence, a guard rail, or the like.

When the position of the shift lever is the drive position (D) and the vehicle speed is equal to or lower than the predetermined vehicle speed (e.g., 30 [km/h]), as the steering assist switch 85 is depressed twice, the steering assist ECU 10 determines that the steering assist request for parallel parking is made to thereby select the parallel parking mode. The parallel parking mode is a mode for performing the steering assist when the vehicle is parked in a direction parallel to the travel direction of the road. The parallel parking is synonymous with parking the own vehicle to be line with other vehicles parked along the travel direction of the road. More specifically, the parallel parking is an operation of parking the own vehicle in such a manner that the front end portion of the own vehicle is opposed to the rear end portion (or front end portion) of the first another vehicle, the rear end portion of the own vehicle is opposed to the front end portion (or rear end portion) of the second another vehicle, and the longitudinal axis passing through the center in the widthwise direction of the own vehicle and the longitudinal axes passing through the centers in the widthwise direction of the first and second another vehicles are substantially on the same line.

Further, when the position of the shift lever is the parking position (P), as the steering assist switch 85 is depressed once, the steering assist ECU 10 determines that the steering assist request for parallel exit-from-parking-space is made to thereby select the parallel exit-from-parking-space mode. The parallel exit-from-parking-space mode is a mode for performing the steering assist when the own vehicle parked by the "parallel parking" exits from the parking space (moves out to the road).

When the parking mode (the perpendicular parking mode or the parallel parking mode) is selected, the steering assist ECU 10 determines the above-mentioned candidate region as a parking-possible region in which the vehicle can be parked. The steering assist ECU 10 sets a target position, which is a position of the own vehicle at the time of completion of the parking, in the parking-possible region. Here, the target position is a position where the central position in plan view of the own vehicle should reach at the time of completion of the parking. The steering assist ECU 10 calculates a movement path for moving the own vehicle from the current position to the target position. For example, the movement path is a path along which the own vehicle can move from the current position to the target position while a predetermined clearance is provided/secured between the vehicle body of the own vehicle and three-dimensional objects (for example, other vehicles, curbs, or guard rails).

The steering assist ECU 10 determines whether or not the own vehicle can move to the target position through one backward movement based on a positional relationship between the current position of the own vehicle and the target position. For example, assuming that the vehicle can move backward with a steering amount within a range up to the maximum steering angle, the steering assist ECU 10 determines whether or not a path/trajectory capable of moving the own vehicle to the target position can be set. When such a path can be set, the steering assist ECU 10 determines that the own vehicle can move to the target position through one backward movement, and determines/sets the above path as the movement path.

Meanwhile, when the above-mentioned path cannot be set, the steering assist ECU 10 determines that forward movement is necessary to reach the target position. The steering assist ECU 10 calculates a first path for moving the own vehicle forward from the current position to a travel-direction-switching position, and a second path for moving the own vehicle backward from the travel-direction-switching position to the target position. The travel-direction-switching position is a position at which the vehicle temporarily stops in order to switch the position of the shift lever from the drive position (D) to the reverse position (R). The steering assist ECU 10 sets the first path and the second path as the movement path. Hereinafter, the travel-direction-switching position is simply referred to as a "switching position".

After setting the movement path, the steering assist ECU 10 calculates a steering angle pattern for moving the own vehicle along the movement path. The steering angle pattern is data that associates each position of the own vehicle on the movement path with a steering angle of the own vehicle at each position, and thus represents a change in the steering angle while the own vehicle travels along the movement path. In this manner, the steering assist ECU 10 includes a "path setting module (path setting unit) 10Y configured to extract the parking-possible region in the periphery of the own vehicle and set the movement path for moving the own vehicle from the current position to the parking-possible region" implemented by the CPU 10a in terms of its function.

When the calculation of the movement path and the steering angle pattern is completed, the steering assist ECU 10 transmits a guidance display command/instruction to the meter ECU 50. The meter ECU 50 causes the display device 51 to display a guidance relating to the parking assist for the own vehicle in accordance with the guidance display command/instruction. For example, it is assumed that the steering assist ECU 10 selects the perpendicular parking mode and calculates the movement path including the first path and the second path. The steering assist ECU 10 causes the display device 51 to display a guidance indicating that the own vehicle is required to move forward via the meter ECU 50 as the guidance relating to the parking assist. In response to this guidance, the driver releases his/her foot from the brake pedal and causes the own vehicle to move forward. When the own vehicle starts moving forward, the steering assist ECU 10 starts the steering assist. Specifically, the steering assist ECU 10 transmits a steering control signal (including a target steering angle) to the EPS ECU 40 in accordance with the movement path and the steering angle pattern. The EPS ECU 40 drives the assist motor 41 in accordance with the steering control signal transmitted from the steering assist ECU 10. As a result of the automatic steering control (steering assist) being executed in this manner, the driver can move the own vehicle to the switching position without operating the steering wheel by himself or herself. When the own vehicle approaches the switching position, the steering assist ECU 10 causes the display device 51 to display a guidance indicating that the own vehicle reaches the switching position shortly via the meter ECU 50. Therefore, the driver operates/presses the brake pedal to stop the own vehicle at the switching position. Next, the steering assist ECU 10 causes the display device 51 to display a guidance indicating that the own vehicle is required to move backward via the meter ECU 50. In response to this guidance, the driver switches the position of the shift lever from the drive position (D) to the reverse position (R). Then, the driver releases his/her foot from the brake pedal and causes the own vehicle to move backward. When the own vehicle starts moving backward, the steering assist ECU 10 starts the steering assist. When the own vehicle approaches the target position, the steering assist ECU 10 causes the display device 51 to display a guidance indicating that the own vehicle reaches the target position shortly via the meter ECU 50. Therefore, the driver operates/presses the brake pedal to stop the own vehicle at the target position. As a result of the automatic steering control (steering assist) being executed in this manner, the driver can move the own vehicle to the target position.

When the exit-from-parking-space mode is selected, the steering assist ECU 10 also performs a similar automatic steering control (steering assist). Specifically, when the exit-from-parking-space mode is selected, the steering assist ECU 10 selects the candidate region as an exit-possible region to which the own vehicle can exit from a parking space, and determines the target position in the exit-possible region. The target position is the position of the own vehicle at the time of completion of exiting from the parking space. The steering assist ECU 10 calculates a movement path and a steering angle pattern for moving the own vehicle from the current position to the target position. Then, for example, the steering assist ECU 10 causes the display device 51 to display a guidance indicating that the own vehicle is required to move forward or backward via the meter ECU 50 as the guidance relating to the exit-from-parking-space mode. The driver moves the shift lever in accordance with this guidance. When the shift lever is moved to an appropriate position from among the drive position (D) and the reverse position (R), the steering assist ECU 10 transmits a steering control signal to the EPS ECU 40 in accordance with the movement path and the steering angle pattern. The EPS ECU 40 performs the automatic steering control in accordance with the steering control signal transmitted from the steering assist ECU 10. In this manner, the steering assist ECU 10 includes a "steering assist module (steering assist unit) 10Z configured to perform the above-mentioned steering assist control" implemented by the CPU 10a in terms of function.

The steering assist ECU 10 may automatically perform a shift control by using the SBW ECU 60, a driving force control by using the engine ECU 20, and a braking force control by using the brake ECU 30 in addition to the steering assist control. For example, the steering assist ECU 10 may transmit a shift control signal to the SBW ECU 60 when the own vehicle reaches the switching position, to thereby cause the SBW ECU 60 to perform the shift control. Further, the steering assist ECU 10 may calculate a speed pattern for causing the own vehicle to travel along the movement path. The speed pattern is data that associates each position of the own vehicle on the movement path with a travel speed at each position, and thus represents a change in the travel speed when the own vehicle travels along the movement path. The steering assist ECU 10 may transmit a braking force control signal to the brake ECU 30 in accordance with the speed pattern, to thereby cause the brake ECU 30 to perform the braking force control. Further, the steering assist ECU 10 may transmit a driving force control signal to the engine ECU 20 in accordance with the speed pattern, to thereby cause the engine ECU 20 to perform the driving force control.

<Setting Processes of Movement Path>
(First Setting Process)

Next, with reference to FIGS. 3 to 5, a "setting procedure of the movement path which is performed by the steering assist ECU 10 (the path setting module 10Y of the steering assist ECU 10)" will be described. In examples illustrated in FIGS. 3 to 5, the steering assist ECU 10 selects/sets the perpendicular parking mode. Further, it is assumed that the steering assist ECU 10 sets, as the movement path, the first path for moving the own vehicle forward from the current position to the switching position, and the second path for moving the own vehicle backward from the switching position to the target position.

When the own vehicle is being moved through the perpendicular parking mode of the steering assist control in a road having a traveling lane and an oncoming lane, there is a possibility that an oncoming vehicle travels in the oncoming lane during the steering assist. However, the above-mentioned related-art apparatus sets the movement path regardless of whether or not an oncoming lane is present. Therefore, the related-art apparatus may set the movement path in such a manner that the own vehicle enters the oncoming lane. In this situation, the own vehicle obstructs the running/traveling of the oncoming vehicle during the steering assist.

In view of the above, when the perpendicular parking mode is selected, the steering assist ECU 10 of the embodiment apparatus first determines whether or not an oncoming lane adjacent to a lane in which the own vehicle is traveling is present, based on the image data from the cameras 84. Hereinafter, the "lane in which the own vehicle is traveling" is referred to as "own lane". Specifically, the steering assist ECU 10 determines whether or not two partition lines for defining the oncoming lane are present based on the image data from the cameras 84. Hereinafter, the "partition line defining between the own lane and the oncoming lane" among the two partition lines is referred to as a "center line" for the sake of convenience. Further, the "other partition line positioned on the side opposite to the own lane with respect to the center line" among the two partition lines is referred to as a "oncoming-lane end line" for the sake of convenience. When the two partition lines (the center line and the oncoming-lane end line) for defining the oncoming lane are present, the steering assist ECU 10 determines that the oncoming lane is present.

When the steering assist ECU 10 determines that the oncoming lane is present at a time point at which the perpendicular parking mode is selected, the steering assist ECU 10 performs a process for setting the movement path (including the first path and the second path) which satisfies a first condition described later. Hereinafter, the "process for setting the movement path satisfying the first condition" is also referred to as a "first setting process".

First condition: (i) when the own vehicle moves forward from the current position to the switching position, the vehicle body does not enter the oncoming lane from the own lane across the center line; and (ii) when the own vehicle moves backward from the switching position to the target position, the vehicle body does not enter the oncoming lane from the own lane across the center line.

According to this configuration, while the own vehicle is moving along the movement path during the steering assist control, the vehicle body does not enter the oncoming lane over the center line, and thus, the own vehicle does not obstruct the running of the oncoming vehicle. Further, the embodiment apparatus can prevent the own vehicle from getting too close to the oncoming vehicle during the steering assist.

Figure 3:
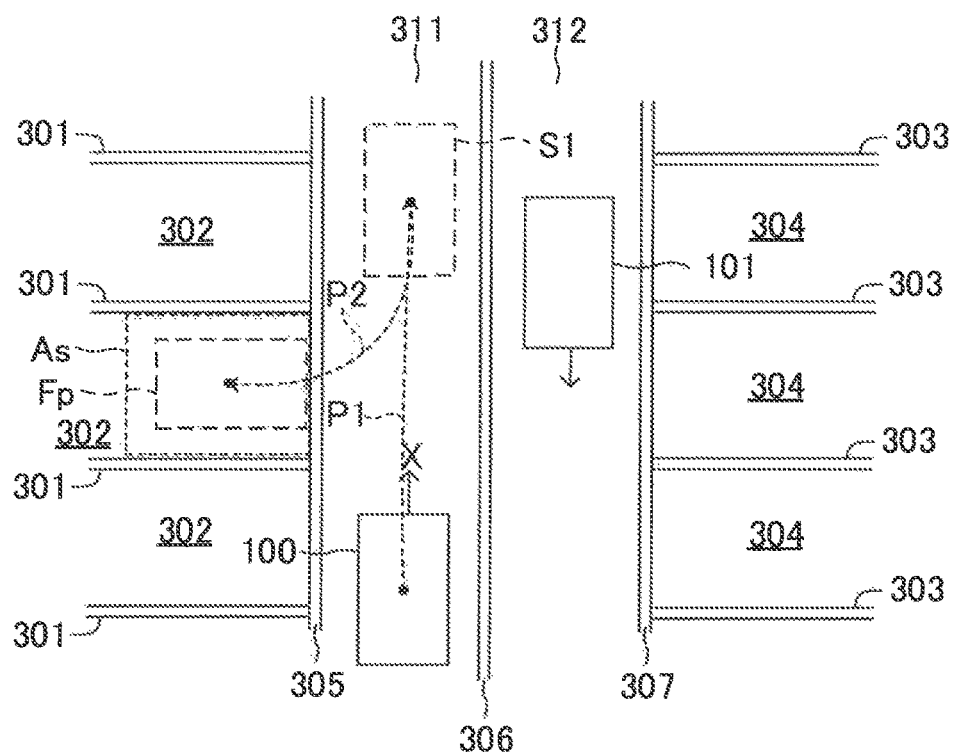
FIG. 3 is a plan view for illustrating a movement path (including a first path and a second path) set by a steering assist ECU according to the embodiment of the present disclosure when an oncoming lane is present.

A parking area illustrated in FIG. 3 has a plurality of parking regions 302 defined by first region partition lines 301, and a plurality of parking regions 304 defined by second region partition lines 303. A first lane 311 and a second lane 312 are present between the plurality of parking regions 302 and the plurality of parking regions 304. The first lane 311 is adjacent to the plurality of parking regions 302, and the second lane 312 is adjacent to the plurality of parking regions 304. The first lane 311 is defined by a first partition line 305 and a center line 306. The second lane 312 is defined by the center line 306 and a second partition line (oncoming-lane end line) 307.

A vehicle (own vehicle) 100 travels in the first lane 311 in a X-direction. Further, another vehicle (oncoming vehicle) 101 travels in the second lane 312 in a direction opposite to the X-direction. In such a situation, the driver depresses the steering assist switch 35 once to thereby request the perpendicular parking mode of the steering assist control. The steering assist ECU 10 determines one region among candidate regions (that is, one of the parking regions 302 which have been detected) as the parking-possible region As, and sets the target position Fp, which is a position of the own vehicle 100 at the time of completion of the parking, in the parking-possible region As.

In the example of FIG. 3, the vehicle 100 cannot move from the current position to the target position Fp through one backward movement. Therefore, the steering assist ECU 10 determines that forward movement is necessary to reach the target position Fp. The steering assist ECU 10 calculates, as the movement path, the first path P1 for moving the own vehicle 100 forward from the current position to the switching position S1 for switching the travel direction of the own vehicle 100, and the second path P2 for moving the own vehicle 100 backward from the switching position S1 to the target position Fp.

Up to the current time point, the steering assist ECU 10 has already recognized/detected the center line 306 and the oncoming-lane end line 307 based on the image data from the cameras 84. Therefore, the steering assist ECU 10 determines that the oncoming lane (that is, the second lane 312) adjacent to the first lane 311 in which the own vehicle 100 is traveling is present. When the steering assist ECU 10 determines that the oncoming lane is present, the steering assist ECU 10 sets the first path P1 and the second path P2 which satisfy the above-mentioned first condition.

More specifically, the steering assist ECU 10 reflects the position of the recognized center line 306 in the two-dimensional map in which the current position of the own vehicle 100 and the travel direction X of the own vehicle 100 are set as references. The steering assist ECU 10 stores, in advance, information on a rectangle similar to the shape of the vehicle body of the own vehicle 100 in the RAM 10b. The steering assist ECU 10 sets the first path P1 in such a manner that the rectangle does not enter the second lane 312 from the first lane 311 across the center line 306 when the rectangle moves forward from the current position to the switching position in the two-dimensional map. The steering assist ECU 10 sets the second path P2 in such a manner that the rectangle does not enter the second lane 312 from the first lane 311 across the center line 306 when the rectangle moves backward from the switching position to the target position in the two-dimensional map. Further, the first path P1 and the second path P2 are set in such a manner that the vehicle body of the own vehicle 100 does not overlap with the first region partition lines 301 (that is, the vehicle body does not pass above the first region partition lines 301). When the own vehicle 100 moves along the first path P1 and the second path P2 obtained as described above, the whole of the vehicle body of the own vehicle 100 does not go beyond the center line 306 into the second lane 312. Therefore, the own vehicle 100 does not obstruct the running of the oncoming vehicle 101 during the steering assist. Further, it is possible to prevent the own vehicle 100 from getting too close to the oncoming vehicle 101.

In addition, when the own vehicle 100 cannot reach the target position Fp from the current position by using only the first path P1 and the second path P2, the steering assist ECU 10 sets first to fourth paths which satisfy the above-mentioned first condition. In this situation, the first path is a path for moving the own vehicle 100 forward from the current position to a first switching position in such a manner that the vehicle body does not enter the second lane 312 from the first lane 311 across the center line 306. The first switching position is a position at which the position of the shift lever is switched from the drive position (D) to the reverse position (R). The second path is a path for moving the own vehicle 100 backward from the first switching position to a second switching position in such a manner that the vehicle body does not enter the second lane 312 from the first lane 311 across the center line 306. The second switching position is a position at which the position of the shift lever is switched from the reverse position (R) to the drive position (D). The third path is a path for moving the own vehicle 100 forward from the second switching position to a third switching position in such a manner that the vehicle body does not enter the second lane 312 from the first lane 311 across the center line 306. The third switching position is a position at which the position of the shift lever is switched from the drive position (D) to the reverse position (R). The fourth path is a path for moving the own vehicle 100 backward from the third switching position to the target position Fp in such a manner that the vehicle body does not enter the second lane 312 from the first lane 311 across the center line 306. Further, these paths are set in such a manner that the vehicle body of the own vehicle 100 does not overlap with the first region partition lines 301 (that is, the vehicle body does not pass above the first region partition lines 301).

(Second Setting Process)

Further, even if the oncoming lane is not present, while the perpendicular parking mode of the steering assist control is being performed, there is a possibility that a following vehicle travels from behind the own vehicle in the lane in which the own vehicle traveled. However, the related-art apparatus sets, when the width of the space which can be used for moving the vehicle is equal to or larger than the predetermined width, the switching position to a position relatively far from the target position. Therefore, when the own vehicle has reached the switching position, a relatively wide space occurs between the own vehicle and the target position. There is a possibility that the following vehicle may enter the above-mentioned space. In this case, the own vehicle cannot move backward to be parked at the target position.

In view of the above, when the oncoming lane is not present, the steering assist ECU 10 of the embodiment apparatus determines whether or not the following vehicle is present behind the own vehicle, based on information from the radar sensors 81, and the detection signals from each of the first ultrasonic sensors 82 and the second ultrasonic sensors 83. When the following vehicle is present behind the own vehicle, the steering assist ECU 10 calculates a time Tc required for the following vehicle to reach the current position of the own vehicle (or required for the following vehicle to approach closest to the current position of the own vehicle). The steering assist ECU 10 obtains the time Tc by dividing the distance between the own vehicle and the following vehicle by the relative speed of the following vehicle with respect to the own vehicle. When the time Tc is equal to or less than a predetermined time threshold Th1, the steering assist ECU 10 determines that there is a possibility that the following vehicle will enter the space behind the own vehicle during the steering assist.

When the steering assist ECU 10 determines that the oncoming lane is not present and the time Tc is equal to or less than the predetermined time threshold Th1 at the time point at which the perpendicular parking mode is selected, the steering assist ECU 10 performs a process for setting the movement path (including the first path and the second path) which satisfies a second condition described later. Hereinafter, the "process for setting the movement path satisfying the second condition" is also referred to as a "second setting process".

Second condition: (i) while the own vehicle is moving along the movement path (including the first path and the second path), a distance in the road-width direction between the vehicle body and the parking-possible region is less than a predetermined distance threshold Th2; and (ii) when the own vehicle reaches the switching position, a part of the vehicle body of the own vehicle is present in a predetermined area present between the parking-possible region and the switching position.

Here, the predetermined distance threshold Th2 is the minimum length (for example, 2.0 m) through which a typical vehicle can pass. The predetermined area is an area set for preventing entry of the following vehicle, and hereinafter is also referred to as an "entry prevention area (or approach prevention area)". When the own vehicle moves along the movement path during the steering assist, the distance in the road-width direction between the own vehicle and the parking-possible region becomes the largest generally at the time point at which the own vehicle reaches the switching position. According to this configuration, even when the own vehicle reaches the furthest position (that is, the switching position) with respect to the parking-possible region, the space between the vehicle body and the parking-possible region becomes smaller than a space through which the following vehicle can pass. Therefore, it is possible to prevent the following vehicle from entering the space between the own vehicle and the parking-possible region.

Figure 4:
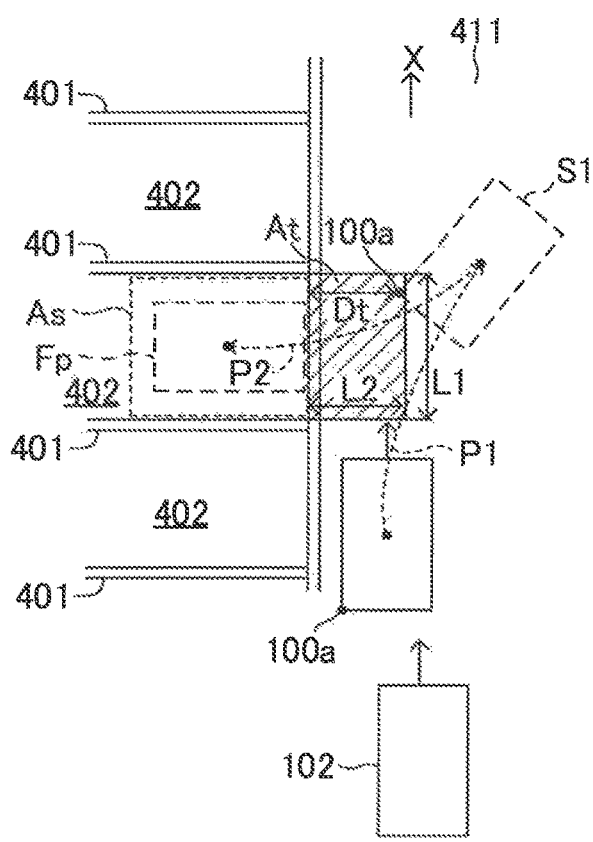
FIG. 4 is a plan view for illustrating the movement path (including the first path and the second path) set by the steering assist ECU according to the embodiment of the present disclosure when a following vehicle is present.

A parking area illustrated in FIG. 4 has a plurality of parking regions 402 defined by region partition lines 401. A lane 411 is a one-way traffic lane (X-direction), and is adjacent to the plurality of parking regions 402. The vehicle (own vehicle) 100 travels in the lane 411 in the X-direction. Further, a following vehicle 102 travels behind the own vehicle 100. In such a situation, the driver depresses the steering assist switch 35 once to thereby request the perpendicular parking mode of the steering assist control. The steering assist ECU 10 determines one region among candidate regions (that is, one of the parking regions 402 which have been detected) as the parking-possible region As, and sets the target position Fp, which is a position of the own vehicle 100 at the time of completion of the parking, in the parking-possible region As.

In the example of FIG. 4, the vehicle 100 cannot move from the current position to the target position Fp through one backward movement. Therefore, the steering assist ECU 10 determines that forward movement is necessary. The steering assist ECU 10 calculates, as the movement path, the first path P1 for moving the own vehicle 100 forward from the current position to the switching position S1, and the second path P2 for moving the own vehicle 100 backward from the switching position S1 to the target position Fp.

Up to the current time point, the steering assist ECU 10 has already recognized/detected the following vehicle 102 based on the information from the radar sensors 81, and the detection signals from each of the first ultrasonic sensors 82 and the second ultrasonic sensors 83. The steering assist ECU 10 calculates the time Tc required for the following vehicle 102 to reach the current position of the own vehicle 100. It is now assumed that the time Tc is equal to or less than the predetermined time threshold Th1. Therefore, the steering assist ECU 10 sets the first path P1 and the second path P2 which satisfy the above-mentioned second condition.

More specifically, the steering assist ECU 10 sets the first path P1 and the second path P2 in such a manner that:

(i) while the rectangle similar to the shape of the vehicle body of the own vehicle 100 moves along the movement path (including the first path P1 and the second path P2) in the two-dimensional map, a distance Dt in the road-width direction between the rectangle and the parking-possible region As is less than the predetermined distance threshold Th2; and (ii) when the rectangle reaches the switching position S1 in the two-dimensional map, a part of the rectangle is present in a predetermined area At.

Here, the predetermined area At corresponds to the above-mentioned "entry prevention area".

The area At is set so as to be in the lane 411 in which the own vehicle 100 is traveling, and be adjacent to the parking-possible region As. A "length L1 in the travel direction of the own vehicle 100" of the area At is set to the same length as a "length in the travel direction of the own vehicle 100" of the parking-possible region As. Further, a "length L2 in a direction perpendicular to the travel direction of the own vehicle 100" of the area At is set to the minimum length (for example, 2.0 m) through which a typical vehicle can pass.

In the present example, the steering assist ECU 10 sets the first path P1 in such a manner that, when the above-mentioned rectangle reaches the switching position S1 in the two-dimensional map, a first corner portion 100a of a rear part of the rectangle is present in the area At. The first corner portion 100a corresponds to the rear-left corner portion of the vehicle body. Further, the steering assist ECU 10 sets the second path P2 based on the set first path P1.

When the own vehicle 100 moves along the first path P1 obtained as described above, even if the own vehicle 100 reaches the furthest position from the target position Fp (that is, the own vehicle 100 reaches the switching position S1), the distance Dt in the road-width direction between the own vehicle 100 and the parking-possible region As is less than the distance through which the following vehicle 102 can pass, and at least "the rear-left corner portion of the vehicle body" of the own vehicle 100 occupies the entry prevention area At adjacent to the parking-possible region As. Therefore, it is possible to prevent the following vehicle 102 from entering the space between the own vehicle 100 and the parking-possible region As. The embodiment apparatus can cause the own vehicle 100 to move backward along the second path P2 to thereby park the own vehicle 100 at the target position Fp finally. Further, since the own vehicle 100 moves without being greatly apart from the target position Fp, it is easy for the driver of the following vehicle 102 to recognize toward which parking region the vehicle 100 is moving in order to be parked. Therefore, it is also possible to urge the driver of the following vehicle 102 to temporarily stop the following vehicle 102 at a position short of the area At, and to wait for a certain time.

In addition, when the own vehicle 100 cannot reach the target position Fp from the current position by using only the first path P1 and the second path P2, the steering assist ECU 10 sets first to fourth paths which satisfy the above-mentioned second condition. In this situation, the first path is a path for moving the own vehicle 100 forward from the current position to a first switching position which is a position at which the position of the shift lever is switched from the drive position (D) to the reverse position (R). The first path is set in such a manner that at least part of the vehicle body is present in the area At when the own vehicle 100 reaches the first switching position. The second path is a path for moving the own vehicle 100 backward from the first switching position to a second switching position which is a position at which the position of the shift lever is switched from the reverse position (R) to the drive position (D). The second path is set in such a manner that at least part of the vehicle body is present in the area At when the own vehicle 100 reaches the second switching position. The third path is a path for moving the own vehicle 100 forward from the second switching position to a third switching position which is a position at which the position of the shift lever is switched from the drive position (D) to the reverse position (R). The third path is set in such a manner that at least part of the vehicle body is present in the area At when the own vehicle 100 reaches the third switching position. The fourth path is a path for moving the own vehicle 100 backward from the third switching position to the target position Fp. (Third Setting Process)

Further, when the oncoming lane is not present and the following vehicle is not present of which the time Tc is equal to or less than the predetermined time threshold Th1, the steering assist ECU 10 performs a process for setting the movement path which satisfies a third condition described later. Hereinafter, the "process for setting the movement path satisfying the third condition" is also referred to as a "third setting process".

Third condition: (i) the switching position is one, that is, the own vehicle 100 can reach the target position Fp from the current position by using only the first path and the second path; and (ii) a sum of the length of the first path P1 and the length of the second path P2 is the minimum.

Figure 5:
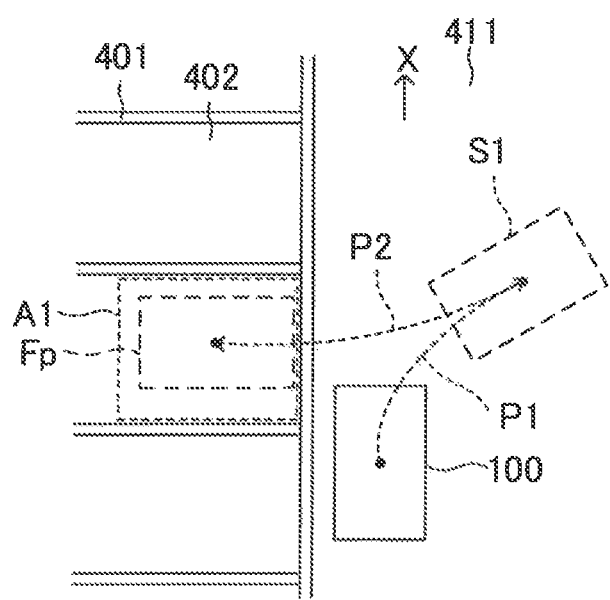
FIG. 5 is a plan view for illustrating the movement path (first path and second path) set by the steering assist ECU according to the embodiment of the present disclosure when the oncoming lane is not present and there is a low possibility that the following vehicle enters the back of the own vehicle during steering assist (or no following vehicle is present).

As illustrated in FIG. 5, the steering assist ECU 10 sets the first path P1 and the second path P2 in such a manner that the movement path includes one switching position and the sum of the length of the first path P1 and the length of the second path P2 is the minimum on the two-dimensional map. When the own vehicle 100 moves along the first path P1 and the second path P2 obtained as described above, since the switching position is one and the movement path is short, the own vehicle 100 can be parked at the target position Fp in a relatively short amount of time.

<Procedure>

A description is now given of a procedure to be performed when the steering assist ECU 10 executes the perpendicular parking mode of the steering assist control. The CPU 10a (hereinafter simply referred to as a "CPU") of the steering assist ECU 10 is configured to execute a "perpendicular parking assist routine" illustrated in FIG. 6 every time a predetermined period elapses. Further, as described above, the CPU executes a routine (not shown), every time a predetermined period elapses, to detect and acquire information on the peripheral state of the own vehicle, using information from the radar sensors 81, the first ultrasonic sensors 82, the second ultrasonic sensors 83 and cameras 84. The information on the peripheral state includes information on partition lines, three-dimensional objects, and a region (candidate region) without the three-dimensional objects. Hereinafter, the above-mentioned information on the peripheral state of the own vehicle is also referred to as "vehicle-peripheral information".

Figure 6:
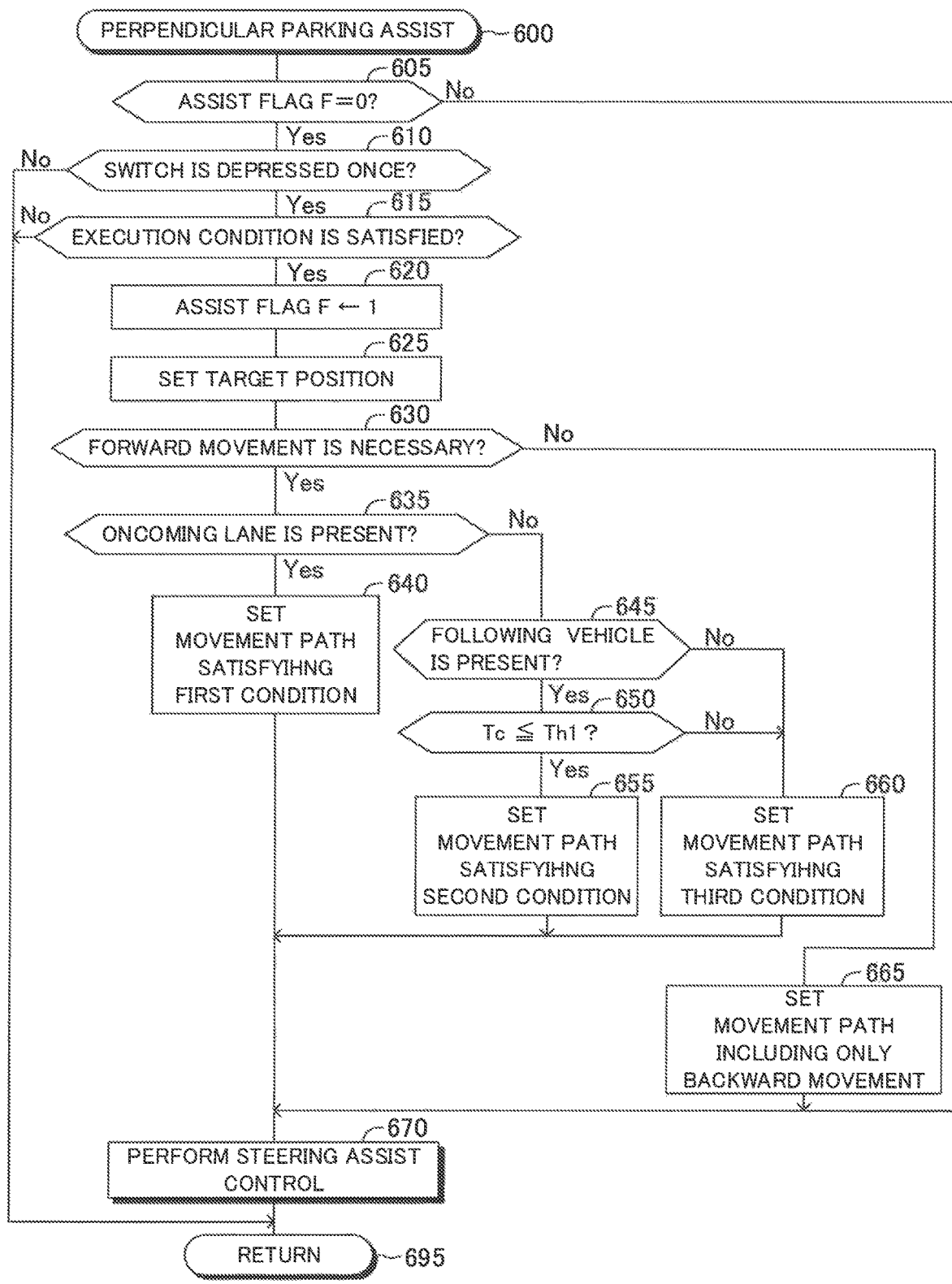
FIG. 6 is a flowchart for illustrating a "perpendicular parking assist routine" to be executed by the steering assist ECU according to the embodiment of the present disclosure.

The CPU starts processing from Step 600 of FIG. 6 at a predetermined timing, and proceeds to Step 605 to determine whether or not a value of an assist flag F is "0". The value of the assist flag F is set to "0" in an initialization routine executed by the CPU when an ignition switch (not shown) is changed from an off state to an on state. Further, the value of the assist flag F is set to "0" also at Step 730 of FIG. 7 described later.

When it is assumed that the value of the assist flag F is "0", at Step 605, the CPU makes a "Yes" determination, and proceeds to Step 610 to determine whether or not the current time point is a "time point immediately after the steering assist switch 85 is depressed only once within a certain time period" (that is, whether or not the steering assist switch 85 is depressed once). The "time point immediately after the steering assist switch 85 is depressed only once within the certain time period" is hereinafter simply referred to as a "turning-on time point".

When the current time point is the "turning-on time point", at Step 610, the CPU makes a "Yes" determination, and proceeds to Step 615 to determine whether or not a predetermined execution condition described later is satisfied.

The predetermined execution condition is a condition satisfied when all of the following Conditions A to C given below are satisfied.

(Condition A) The current position of the shift lever is the drive position (D).

(Condition B) The current vehicle speed is equal to or lower than a predetermined speed threshold (for example, 30 km/h).

(Condition C) The CPU has detected a candidate region adjacent to a lane in which the own vehicle is traveling. The candidate region is a region where the shortest distance from the own vehicle is equal to or shorter than a predetermined distance, and which has a size allowing the own vehicle to be parked by the perpendicular parking. For example, Condition C is satisfied when the CPU has detected a candidate region adjacent to a lane (own lane) in which the own vehicle is traveling, the candidate region satisfying the following (i) and (ii):

(i) a "length in the travel direction of the own vehicle" is equal to or longer than a predetermined first length; and (ii) a "length in a direction perpendicular to the travel direction (in a direction away from the own vehicle, i.e., the depth direction)" is equal to or longer than a predetermined second length.

The predetermined first length is a sum of a length in the widthwise direction of the own vehicle and a first margin (the minimum length required for an occupant to get on and off the own vehicle). The predetermined second length is a sum of a length in the front-rear direction of the own vehicle and a second margin (the minimum length required for the occupant to open and close the rear trunk).

More specifically, in a case where the value of the assist flag F is "0" (that is, the steering assist control is not being performed), the steering assist switch 85 is depressed only one time within the certain time period, and the above-mentioned Condition A and Condition B are both satisfied, a parking steering assist request is made (that is, the steering assist request for perpendicular parking is made). Further, when the parking steering assist request is made and the above-mentioned Condition C is satisfied, a parking assist execution request (parking assist execution request for perpendicular parking) is made.

When the execution condition is satisfied, the CPU makes a "Yes" determination at Step 615, and proceeds to Step 620 to set the value of the assist flag F to "1". Next, the CPU proceeds to Step 625 to determinate the candidate region as the parking-possible region As. Then, the CPU sets, in the parking-possible region As, the target position Fp which is a position of the own vehicle at the time of completion of the parking.

Next, at Step 630, the CPU determines whether or not forward movement is necessary to move the own vehicle to the target position Fp. Specifically, the CPU determines whether or not the own vehicle can move to the target position through one backward movement based on the positional relationship between the current position of the own vehicle and the target position Fp. When the own vehicle cannot move to the target position Fp through one backward movement, the CPU determines that forward movement is necessary. In this case, the CPU makes a "Yes" determination at Step 630, and proceeds to Step 635.

At Step 635, the CPU determines whether or not the oncoming lane is present. It is assumed that the oncoming lane is now present. In this case, since the CPU has recognized the two partition lines (the center line 306 and the oncoming-lane end line 307) based on the vehicle-peripheral information, the CPU makes a "Yes" determination at Step 635, and proceeds to Step 640.

When the CPU proceeds to Step 640, the CPU sets the movement path which satisfies the above-mentioned first condition. That is, the CPU sets the movement path (including the first path P1 and the second path P2) in such a manner that (i) when the own vehicle moves forward from the current position to the switching position S1, the vehicle body does not enter the oncoming lane from the own lane across the center line, and (ii) when the own vehicle moves backward from the switching position S1 to the target position Fp, the vehicle body does not enter the oncoming lane from the own lane across the center line. Further, the CPU calculates the steering angle pattern for causing the own vehicle to travel along the movement path. Thereafter, at Step 670, the CPU transmits the steering control signal (including the target steering angle) to the EPS ECU 40 in accordance with the movement path and the steering angle pattern to thereby perform the steering assist control (automatic steering control). Then, the CPU proceeds to Step 695 to tentatively terminate the present routine.

Meanwhile, at the time point at which the CPU executes the processing of Step 635, when no oncoming lane is present, the CPU makes a "No" determination at Step 635, and proceeds to Step 645 to determine whether or not the following vehicle is present.

It is assumed that the following vehicle is present. In this case, the CPU has detected the following vehicle based on the vehicle-peripheral information. Therefore, the CPU makes a "Yes" determination at Step 645, and proceeds to Step 650. At Step 650, the CPU calculates the time Tc required for the following vehicle to reach the current position of the own vehicle. The CPU determines whether or not the time Tc is equal to or less than the predetermined time threshold Th1. When the time Tc is equal to or less than the predetermined time threshold Th1, the CPU makes a "Yes" determination at Step 650, and proceeds to Step 655.

At Step 655, the CPU sets the movement path which satisfies the above-mentioned second condition. That is, the CPU sets the movement path (including the first path P1 and the second path P2) in such a manner that (i) the distance Dt in the road-width direction between the vehicle body and the parking-possible region As is less than the predetermined distance threshold Th2 while the own vehicle is moving along the movement path; and (ii) when the own vehicle reaches the switching position S1, the part of the vehicle body of the own vehicle is present in the predetermined area At present between the target position Fp and the switching position S1.

Further, the CPU calculates the steering angle pattern for causing the own vehicle to travel along the movement path. Next, at Step 670, the CPU transmits the steering control signal to the EPS ECU 40 in accordance with the movement path and the steering angle pattern to thereby perform the steering assist control. Then, the CPU proceeds to Step 695 to tentatively terminate the present routine.

Meanwhile, at the time point at which the CPU executes the processing of Step 645, when no following vehicle is present, the CPU makes a "No" determination at Step 645, and proceeds to Step 660. Further, at the time point at which the CPU executes the processing of Step 650, when the time Tc is larger than the predetermined time threshold Th1, the CPU makes a "No" determination at Step 650, and proceeds to Step 660.

As the CPU proceeds to Step 660, the CPU sets the movement path which satisfies the above-mentioned third condition. That is, the CPU sets the movement path (the first path P1 and the second path P2) in such a manner that the movement path includes only one switching position, and the sum of the length of the first path P1 and the length of the second path P2 is the minimum. Further, the CPU calculates the steering angle pattern for causing the own vehicle to travel along the movement path. Thereafter, at Step 670, the CPU transmits the steering control signal to the EPS ECU 40 in accordance with the movement path and the steering angle pattern to thereby perform the steering assist control. Then, the CPU proceeds to Step 695 to tentatively terminate the present routine.

At the time point at which the CPU executes the processing of Step 630, when the own vehicle can move to the target position Fp through one backward movement, the CPU determines that forward movement is unnecessary. Therefore, the CPU makes a "No" determination at Step 630, and proceeds to Step 665. At Step 665, the CPU sets the movement path including only backward movement. Further, the CPU calculates the steering angle pattern for causing the own vehicle to travel along the movement path. Thereafter, at Step 670, the CPU performs the steering assist control in accordance with the movement path and the steering angle pattern. Then, the CPU proceeds to Step 695 to tentatively terminate the present routine.

At the time point at which the CPU executes the processing of Step 605, when the value of the assist flag F is not "0", the CPU makes a "No" determination at Step 605, and proceeds to Step 670. At Step 670, the CPU continues performing the steering assist control in accordance with the movement path and the steering angle pattern which have already been calculated/determined. Then, the CPU proceeds to Step 695 to tentatively terminate the present routine.

At the time point at which the CPU executes the processing of Step 610, when the current time point is not the "turning-on time point", the CPU makes a "No" determination at Step 610, and proceeds directly to Step 695 to tentatively terminate the present routine. In addition, at the time point at which the CPU executes the processing of Step 615, when the execution condition is not satisfied, the CPU makes a "No" determination at Step 615, and proceeds directly to Step 695 to tentatively terminate the present routine.

There may be cases in which the CPU cannot set the movement path satisfying the condition in each of the Steps 640, 655 and 660. In such cases, the CPU cancels the steering assist control. That is, the CPU does not proceed to Step 670. In this case, the CPU sets the value of the assist flag F to "0", and then, proceeds to Step 695 to tentatively terminate the present routine.

Figure 7:
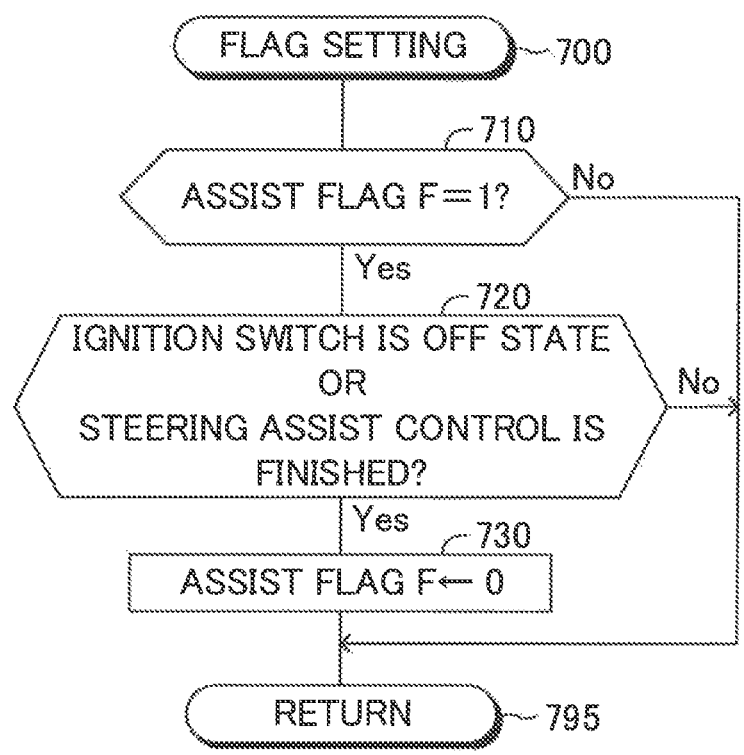
FIG. 7 is a flowchart for illustrating a "flag setting routine" to be executed by the steering assist ECU according to the embodiment of the present disclosure.

Further, the CPU is configured to execute a "flag setting routine" illustrated in FIG. 7 every time a predetermined period elapses. Thus, the CPU starts processing from Step 700 of FIG. 7 at a predetermined timing, and proceeds to Step 710 to determine whether or not the value of the assist flag F is "1". When the value of the assist flag F is not "1", the CPU makes a "No" determination at Step 710, and proceeds directly to Step 795 to tentatively terminate the present routine.

In contrast, when the value of the assist flag F is "1", the CPU makes a "Yes" determination at Step 710, and proceeds to Step 720 to determine whether or not one or both of Condition D and Condition E given below are satisfied. (Condition D) The ignition switch is in the off state. (Condition E) The current (present) time point is a time point immediately after the steering assist control has just been finished/completed.

The steering assist control performed at Step 670 of FIG. 6 is finished when the own vehicle reaches the target position Fp, which is a position to be reached when the own vehicle completes parking to the parking space. In addition, the CPU may be configured to finish/complete the steering assist control also when a "specific operation for stopping the steering assist control is performed on the steering assist switch 85". The CPU may be configured to automatically finish the steering assist control when a distance between the own vehicle and a moving object (another vehicle, pedestrian and the like) is less than a predetermined distance while the steering assist control is being performed.

When neither Condition D nor Condition E is satisfied, the CPU makes a "No" determination at Step 720, and directly proceeds to Step 795 to tentatively terminate this routine.

To the contrary, when one or both of Condition D and Condition E are satisfied, the CPU makes a "Yes" determination at Step 720, and proceeds to Step 730 to set the value of the assist flag F to "0". Therefore, on and after this time point, as the CPU proceeds to Step 605 of FIG. 6, the CPU makes a "Yes" determination. As the steering assist switch 85 is depressed only once within the certain time period thereafter, the CPU starts the steering assist control for perpendicular parking (Step 610:Yes).

As described above, at the time point at which the parking assist execution request for perpendicular parking is made, when the embodiment apparatus determines that the oncoming lane (second lane 312) adjacent to the lane (first lane 311) in which the own vehicle is traveling is present, the embodiment apparatus sets the first path P1 and the second path P2 in such a manner that the vehicle body of the own vehicle 100 does not go beyond the center line 306 partitioning the first lane 311 and the second lane 312 while the own vehicle 100 is moving along the first path P1 and the second path P2. Therefore, while the own vehicle 100 moves along the first path P1 and the second path P2, the own vehicle 100 does not obstruct the running of the oncoming vehicle 101.

Further, in a case where no oncoming lane is present and the following vehicle 102 is present at the time point at which the parking assist execution request for perpendicular parking is made, when the time Tc required for the following vehicle 102 to reach the current position of the own vehicle is equal to or less than the predetermined time threshold Th1, the embodiment apparatus sets the movement path as follows. That is, the embodiment apparatus sets the movement path (including the first path P1 and the second path P2) in such a manner that:

(i) the distance Dt in the road-width direction between the vehicle body and the parking-possible region As is less than the predetermined distance threshold Th2 (the distance through which the following vehicle 102 can pass) while the own vehicle is moving along the movement path; and (ii) when the own vehicle reaches the switching position S1, the part of the vehicle body of the own vehicle is present in the predetermined area At (entry prevention area) between the parking-possible region As and the switching position S1.

According to this configuration, even when the own vehicle reaches the furthest position from the target position Fp (that is, the own vehicle reaches the switching position S1), the space between the own vehicle 100 and the parking-possible region As becomes smaller than a space through which the following vehicle 102 can pass. Therefore, it is possible to prevent the following vehicle 102 from entering between the own vehicle and the target position Fp. There is a high possibility that the own vehicle 100 can move without being obstructed by the following vehicle 102 during the steering assist control (that is, the parking assist), so that the vehicle 100 can move backward along the second path P2 and finally can be parked at the target position Fp.

The present disclosure is not limited to the above-mentioned embodiment, and various changes can be adopted within the scope of the present disclosure.

The first condition is not limited to the above-mentioned example, and thus, may be any condition as long as the own vehicle does not obstruct the running of the oncoming vehicle. For example, the first condition may be the following condition.

First Condition: when the own vehicle moves from the current position to the parking-possible region, the vehicle body of the own vehicle does not enter the oncoming lane side from the own lane across a predetermined line defined by translating the center line by a predetermined distance in the road-width direction.

Figure 8:
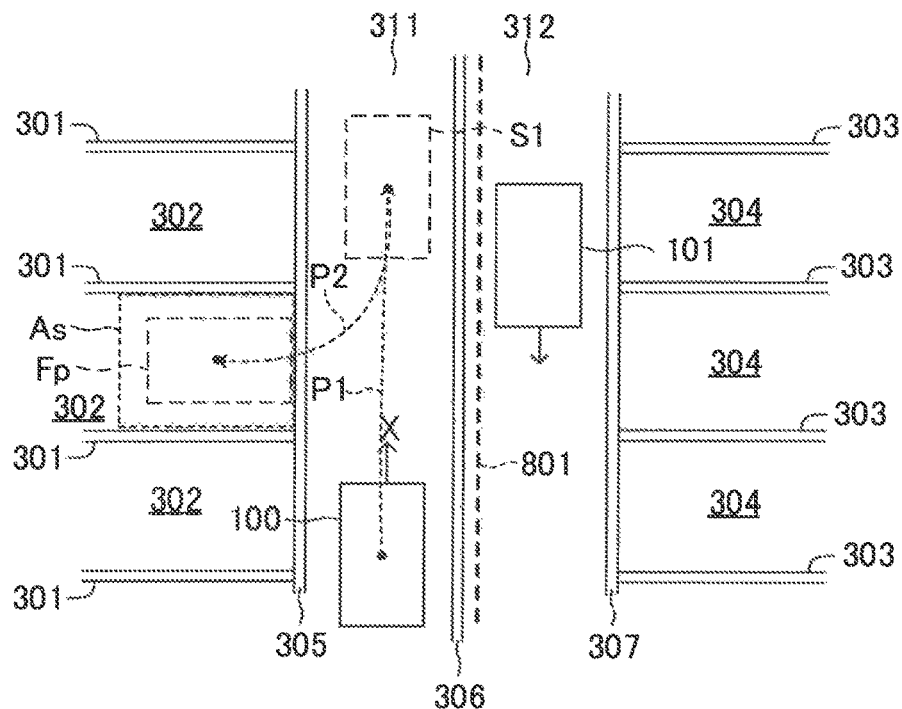
FIG. 8 is a plan view for illustrating a modified example of the movement path (including the first path and the second path) set by the steering assist ECU according to the embodiment of the present disclosure when the oncoming lane is present.
Figure 9:
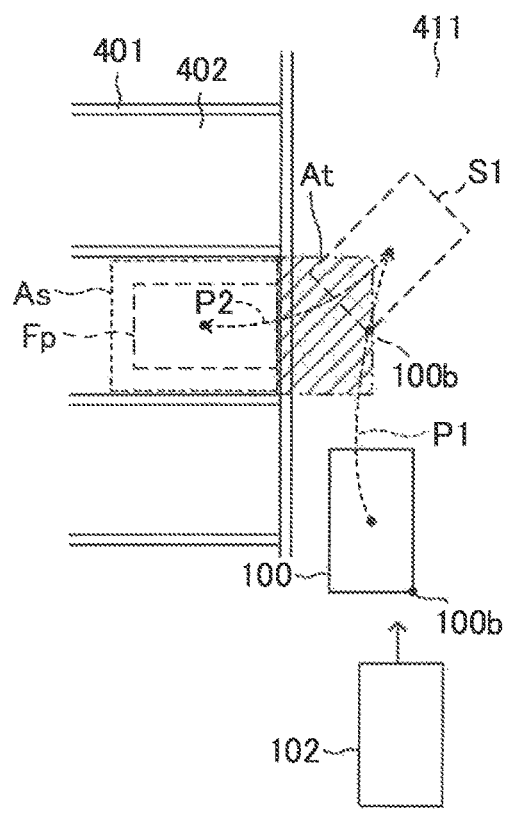
FIG. 9 is a plan view for illustrating a modified example of the movement path (including the first path and the second path) set by the steering assist ECU according to the embodiment of the present disclosure when the following vehicle is present.

As illustrated in FIG. 8, the steering assist ECU 10 sets/defines an imaginary line 801 obtained by translating the center line 306 toward the second lane (oncoming lane) side by a predetermined distance. This predetermined distance is set in such a manner that a distance in the road-width direction between the imaginary line 801 and the oncoming-lane end line 307 is equal to or longer than the minimum distance (for example, 2.0 m) through which a typical vehicle can pass.

The steering assist ECU 10 sets the first path P1 and the second path P2 in such a manner that:

(i) when the own vehicle 100 moves forward from the current position to the switching position S1, the vehicle body does not enter the second lane 312 from the first lane 311 across the imaginary line 801; and (ii) when the own vehicle 100 moves backward from the switching position S1 to the target position Fp, the vehicle body does not enter the second lane 312 from the first lane 311 across the imaginary line 801.

For example, in a case where the road width of the first lane (own lane) 311 is relatively small, it is sometimes difficult to set the movement path in such a manner that the vehicle body does not go beyond (move across) the center line 306. In such a case, according to the configuration of this modified example, it is possible to allow a part of the vehicle body of the own vehicle to go beyond the center line 306 to the extent that the own vehicle 100 does not obstruct the running of the oncoming vehicle 101.

The second condition is not limited to the above-mentioned example. For example, the second condition may include only the following condition: the distance Dt in the road-width direction between the own vehicle and the parking-possible region is less than the predetermined distance threshold Th2. In also this modified example, while the own vehicle is moving along the movement path, the distance Dt becomes less than a distance through which the following vehicle 102 can pass. Therefore, it is possible to prevent the following vehicle 102 from entering between the own vehicle and the parking-possible region.

The steering assist ECU 10 may perform a process for setting the first path P1 and the second path P2 as the second setting process in such a manner that a predetermined portion of the vehicle body is present in the area At when the own vehicle 100 reaches the switching position S1. For example, the above-mentioned predetermined portion may be a "rear end portion of a side surface of the vehicle body" on the side close to the following vehicle 102 when the own vehicle 100 reaches the switching position S1. As illustrated in IFG. 9, the steering assist ECU 10 sets the first path P1 and the second path P2 in such a manner that, when the rectangle representing the own vehicle 100 reaches the switching position S1 in the two-dimensional map, at least "a second corner portion 100b on the rear side of the rectangle" is present in the area At. The second corner portion 100b corresponds to a right corner portion of the rear end portion of the vehicle body. According to this modified example, when the own vehicle 100 reaches the switching position S1, at least the right corner portion of the rear end portion of the vehicle body is present in the area At. As compared to the example shown in FIG. 4, a wider part of the vehicle body occupies the area At, and therefore, the space between the own vehicle 100 and the target position Fp becomes smaller. Accordingly, it is possible to more effectively prevent the following vehicle 102 from entering the area At.

At Step 635, the CPU may acquire the road information (including the number of lanes included in a road, and the width of the road) through the navigation ECU 70, and determine whether or not the oncoming lane is present. Further, the CPU may acquire parking-area information (including the number of lanes in the road, and the width of the road) from an external information distribution center via a communication device (not shown) incorporated into the own vehicle, and determine whether or not the oncoming lane is present. In each of the above-mentioned modified examples, at Step 640, the CPU may reflect (specify) the position of the center line on the two-dimensional map by using the acquired information on the width of the lane. More specifically, the CPU recognizes the first partition line as the vehicle-peripheral information. The CPU may determine/regard, as the position of the center line, a position away from the recognized first partition line by a distance of "the width of the road/2" in the road-width direction. According to each of the above-mentioned modified examples, even if the center line cannot be recognized from the image data of the cameras 84 because the center line (white line) is thin, the CPU can set the movement path in such a manner that the vehicle body does not go beyond the center line.

At Step 650, the CPU may use another condition in place of or in addition to the time Tc. For example, at Step 650, the CPU may calculate a distance Dc between the own vehicle and the following vehicle, and determine whether or not the distance Dc is equal to or less than a predetermined threshold Th3. When the distance Dc is equal to or less than the predetermined threshold Th3, the CPU makes a "Yes" determination at Step 650, and proceeds to Step 655. On the other hand, when the distance Dc is larger than the predetermined threshold Th3, the CPU makes a "No" determination at Step 650, and proceeds to Step 660.

Further, Step 650 may be omitted. That is, when the CPU determines that the following vehicle is present at Step 645, the CPU may directly proceed to Step 655. Meanwhile, when no following vehicle is present at Step 645, the CPU may directly proceed to Step 660.

At Step 665, when the oncoming lane is present, the CPU may set the movement path so as to satisfy the above-mentioned first condition.

The steering assist control for perpendicular parking may include a second perpendicular parking mode in addition to the above-mentioned perpendicular parking mode. The second perpendicular parking mode is a mode for performing the steering assist when the vehicle moves backward and then moves forward to be parked in such a manner that the longitudinal axis of the own vehicle and the longitudinal axes of the first and second another vehicles are parallel to each other. In this case, the steering assist ECU 10 calculate a first path P1' for moving the own vehicle backward from the current position to a switching position S1', and a second path P2' for moving the own vehicle forward from the switching position S1' to the target position Fp. The switching position S1' is a position at which the vehicle temporarily stops in order to switch the position of the shift lever from the reverse position (R) to the drive position (D).

In the case of the second perpendicular parking mode, the CPU determines that the first condition is satisfied when the following (i) and (ii) are satisfied:

(i) when the own vehicle moves backward from the current position to the switching position S1', the vehicle body does not go beyond (move across) the center line; and (ii) when the own vehicle moves forward from the switching position S1' to the target position Fp, the vehicle body does not go beyond (move across) the center line.

In the same manner as the above, the CPU determines that the second condition is satisfied when the following condition is satisfied: a part of the vehicle body is present in the area At when the own vehicle reaches the switching position S1'.

The steering assist switch 85 is only required to be a switch to be operated when the driver requests the steering assist to generate a signal indicating the request (that is, when the steering assist request is made). Further, the steering assist switch may be an apparatus configured to use a speech recognition apparatus to recognize an oral (voice) request from the driver for the steering assist. This speech recognition apparatus is equivalent to a switch to be operated through speech (oral sound), and can serve as the operation switch (operation unit) in the above embodiment apparatus.

When the parallel parking mode is selected, the steering assist ECU 10 may set the movement path for parallel parking by using the above-mentioned first condition.

In place of the steering assist control for automatically changing the steering angle of steered wheels, the steering assist ECU 10 may instruct the driver about the steering direction of the steering wheel as the steering assist. Specifically, the steering assist ECU 10 may cause a speaker (not shown) to generate sound and cause the display device 51 to display a message in such a manner that the own vehicle moves along the movement path.

What is claimed is:

1. A steering assist apparatus applied to an own vehicle, comprising a controller configured to:
   acquire vehicle-peripheral information on a vehicle peripheral state including partition lines and three-dimensional objects which are present in a periphery of the own vehicle;
   extract a parking-possible region in the periphery of the own vehicle based on the vehicle-peripheral information acquired by the controller;
   determine whether or not a steering assist request is made;
   wherein, when the steering assist request is made, the controller is configured to perform:
   a first setting process for setting a movement path, from a current position of the own vehicle to the parking possible region, when the controller determines that (i) a following vehicle traveling behind the own vehicle is present and (ii) a time required for the following vehicle to reach a current position of the own vehicle is equal to or less than a predetermined time threshold based on the vehicle-peripheral information-, wherein the first setting process includes setting the movement path in such a manner that a distance in a road-width direction between a vehicle body of the own vehicle and the parking-possible region is less than a predetermined distance threshold while the own vehicle is moving along the movement path; and a second setting process for setting the movement path when the controller determines that (i) the following vehicle traveling behind the own vehicle is not present or (ii) the following vehicle is present and the time required for the following vehicle to reach the current position of the own vehicle is more than the predetermined time threshold based on the vehicle-peripheral information, wherein the second setting process includes setting the movement path in such a manner that a total length of the movement path includes a single travel direction switching position; and perform a steering assist control for automatically steering the own vehicle so that the own vehicle moves along the movement path that has been set.

2. The steering assist apparatus according to claim 1, wherein the controller is further configured to, when the own vehicle cannot move to the parking-possible region through one backward movement or one forward movement, set at least a first path and a second path as the movement path, the first path being a path for moving the own vehicle from the current position to a travel-direction switching position for switching a travel direction of the own vehicle, and the second path being a path for moving the own vehicle from the travel-direction switching position to the parking-possible region, and wherein the controller is configured to set the first path and the second path in the first setting process in such a manner that the distance in the road-width direction between the vehicle body of the own vehicle and the parking-possible region does not exceed the predetermined distance threshold when the own vehicle reaches the travel-direction switching position.

3. The steering assist apparatus according to claim 2, wherein the controller is configured to set the first path in the first setting process in such a manner that a part of the vehicle body of the own vehicle is present in an entry prevention area which is set between the parking-possible region and the travel-direction switching position when the own vehicle reaches the travel-direction switching position.

4. The steering assist apparatus according to claim 3, wherein the controller is configured to set the first path in the first setting process in such a manner that at least a rear end portion of a side surface of the vehicle body on a side close to the following vehicle is present in the entry prevention area when the own vehicle reaches the travel-direction switching position.

5. The steering assist apparatus according to claim 1, wherein the controller is configured to:

perform a third setting process for setting the movement path when the controller determines that an oncoming lane adjacent to an own lane in which the own vehicle is traveling is present based on the vehicle-peripheral information, the third setting process being a process for setting the movement path in such a manner that a vehicle body of the own vehicle does not enter a side of the oncoming lane from the own lane across (i) a center line partitioning the own lane and the oncoming lane or (ii) a predetermined line obtained by translating the center line in a road-width direction by a predetermined distance; and perform the first setting process when the controller determines that the oncoming lane is not present, the following vehicle is present and the time required for the following vehicle to reach the current position of the own vehicle is equal to or less than the predetermined time threshold.

\* \* \* \* \*